US012185056B2

(12) United States Patent
Shi

(10) Patent No.: US 12,185,056 B2
(45) Date of Patent: Dec. 31, 2024

(54) SOUND DEVICE

(71) Applicant: AAC Microtech (Changzhou) Co., Ltd., Changzhou (CN)

(72) Inventor: Yang Shi, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 249 days.

(21) Appl. No.: 18/073,467

(22) Filed: Dec. 1, 2022

(65) Prior Publication Data

US 2024/0073587 A1 Feb. 29, 2024

Related U.S. Application Data

(63) Continuation of application No. PCT/CN2022/115481, filed on Aug. 29, 2022.

(51) Int. Cl.

*H04R 1/28* (2006.01)
*H04R 7/04* (2006.01)
*H04R 9/02* (2006.01)
*H04R 9/04* (2006.01)
*H04R 9/06* (2006.01)

(52) U.S. Cl.

CPC ............. *H04R 1/2811* (2013.01); *H04R 7/04* (2013.01); *H04R 9/027* (2013.01); *H04R 9/046* (2013.01); *H04R 9/06* (2013.01); *H04R 2499/11* (2013.01)

(58) Field of Classification Search

CPC ........ H04R 1/2811; H04R 7/04; H04R 9/027; H04R 9/046; H04R 9/06; H04R 2499/11; H04R 1/04

See application file for complete search history.

(56) References Cited

U.S. PATENT DOCUMENTS

2019/0037304 A1* 1/2019 Ji .......................... H04R 3/007

* cited by examiner

*Primary Examiner* — Kile O Blair
(74) *Attorney, Agent, or Firm* — W&G Law Group

(57) ABSTRACT

The present disclosure discloses a sound device includes a frame having a receiving space, a vibration system and a magnet system having a magnetic gap; the vibration system includes a diaphragm and a coil; the magnet system includes a yoke and a magnet; the sound device further includes a FPCB connecting the coil with an outer circuit; the FPCB includes a first welding portion connecting with the coil, a second welding portion connecting with the outer circuit, and a connection portion connecting the first welding portion and the second welding portion, the second welding portion is fixed to the frame and located outside the receiving space. The sound device in the present disclosure has higher space utilization rate.

10 Claims, 4 Drawing Sheets

A-A

SOUND DEVICE

FIELD OF THE PRESENT DISCLOSURE

The present disclosure relates to electro-acoustic transducers, especially relates to a sound device applied in mobile device.

DESCRIPTION OF RELATED ART

With the development of electronic technologies, users have increasingly demands for acoustic quality for portable mobile terminals, in which a sound device is generally used for the playback of audio signal. At the same time, sound device needs to comply with the thinner and lighter trend of the portable mobile terminals.

In related art, the sound device usually includes a frame, a vibration system fixed to the frame, and a magnet having a magnetic gap; the magnet system includes a yoke and magnet; the vibration system includes a diaphragm configured to generate sound, and a coil inserted in the magnetic gap drive the diaphragm. Generally, a FPCB (flexible printed circuit board) and an electrical terminal are configured to electrically active the coil. Specifically, the coil is electrically connected with the FPCB; the electrical terminal includes an inner welding pad connecting with the FPCB and an outer welding pad connecting with an outer circuit to form an electrical path. However, a welding part configured to connect the FPCB with the inner welding pad of the electrical terminal is located inside the frame, which occupies the inner space of the sound device and affects the welding process negatively.

Therefore, it is necessary to provide an improved sound device to overcome the problems mentioned above.

SUMMARY OF THE INVENTION

The present disclosure provides a sound device with higher space utilization rate and simpler welding process.

The sound device includes a frame with a receiving space; a magnet system having a magnetic gap, including: a yoke fixed to the frame; and a magnet mounted on the yoke; a vibration system received in the receiving space, including: a diaphragm fixed to the frame; and a coil fixed to the diaphragm and inserted into the magnetic gap; a FPCB electrically connecting the coil with an outer circuit, including: a first welding portion connected with the coil; a second welding portion fixed to the frame and located outside the receiving space for connecting with the outer circuit; and a connection portion connecting the first welding portion and the second welding portion.

Further, the coil is in a rounded rectangle shape, the first welding portion is fixed to an end of the coil away from the diaphragm along a short axis.

Further, the frame includes a main body fixed with the diaphragm, the main body includes a first fixation surface fixed with the diaphragm and a second fixation surface opposite to the first fixation surface along a vibration direction of the diaphragm, the second welding portion is fixed to the second fixation surface.

Further, the main body includes a first body portion extending along a long axis of the coil, a second body portion extending along the short axis of the coil, and a corner portion connecting the first body portion and the second body portion, the second welding portion is fixed to the corner portion.

Further, the magnet includes a main magnet, a first side magnet spaced apart from the main magnet and extending along the long axis of the coil, and a second side magnet spaced apart from the main magnet and extending along the short axis of the coil; the magnetic gap is formed between the main magnet, the first side magnet and the second side magnet; an avoidance gap is formed between the first side magnet and the second side magnet; the first welding portion is received in the magnetic gap, the connection portion extends outside the magnetic gap through the avoidance gap.

Further, the connection portion includes a first connection portion extending from the first welding portion and passing through the avoidance gap, a second connection portion bending and extending from the first connection portion, and a third connection portion extending from the second connection portion and fixed to the second body portion; the second connection portion surrounds the second side magnet, the third connection portion is fixed to the second welding portion.

Further, a number of the FPCB is two; the two FPCBs are separately arranged on the two short axis of the coil; the two second welding portions are diagonally fixed to the corner portion of the main body.

Further, the sound device includes an electrical terminal fixed to the main body; the electrical terminal includes three third welding portions, one of the three third welding portions is electrically connected with one of the second welding portions, the other two of the three welding portions are diagonally fixed to the corner portion of the main body.

Further, the yoke includes a bottom plate fixed with the main magnet and a flange bending and extending from an edge along a short axis of the bottom plate; the flange is fixed to the second body portion; the third connection portion is sandwiched between the flange and the second body portion.

Further, the frame includes a protrusion extending from an inner edge of the corner portion towards the yoke; the second welding portion is located outside the protrusion; the protrusion is fixed to the bottom plate.

BRIEF DESCRIPTION OF THE DRAWINGS

The present disclosure will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
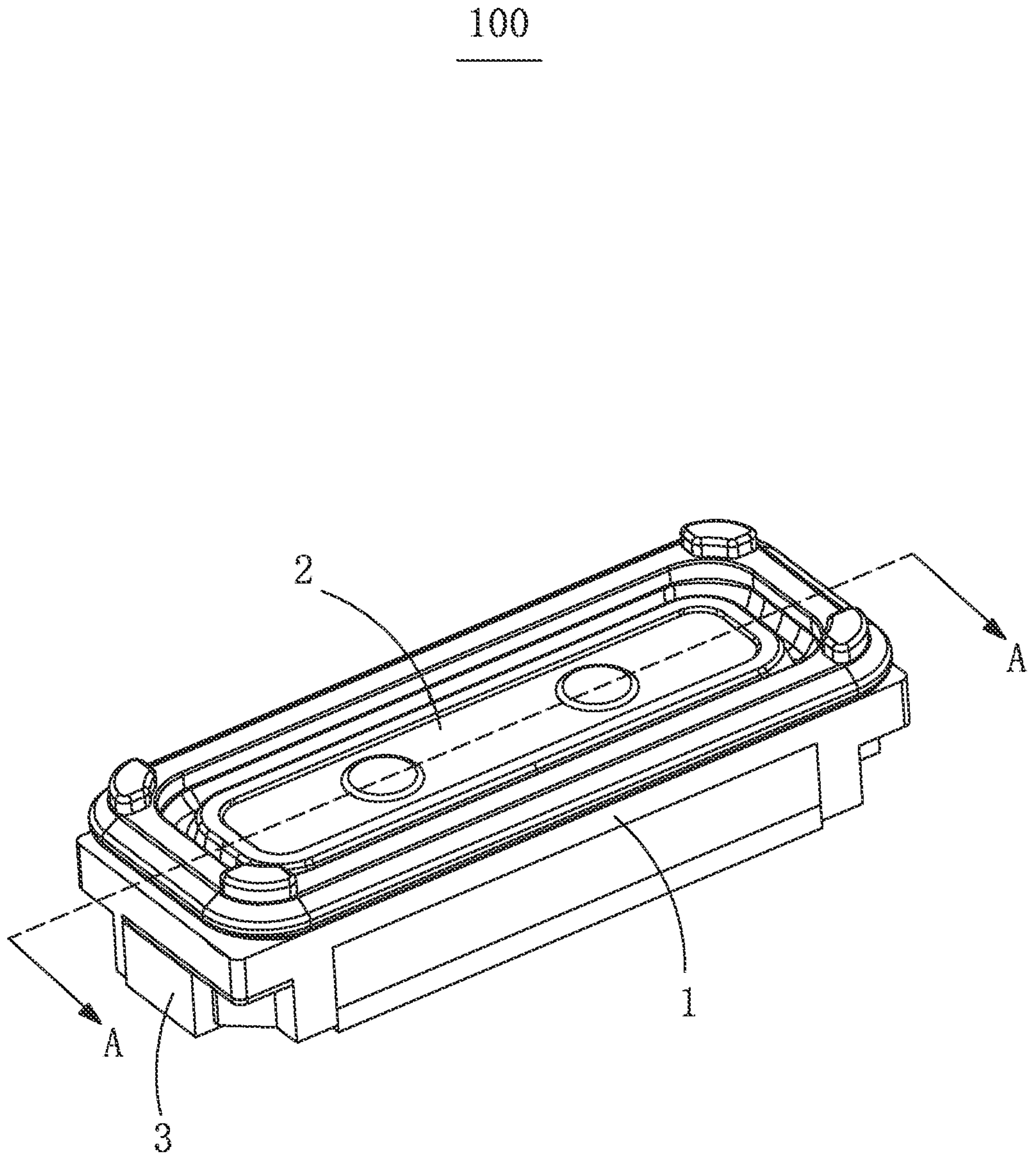
FIG. 1 is an isometric view of a sound device in accordance with an exemplary embodiment of the present disclosure.
Figure 2:
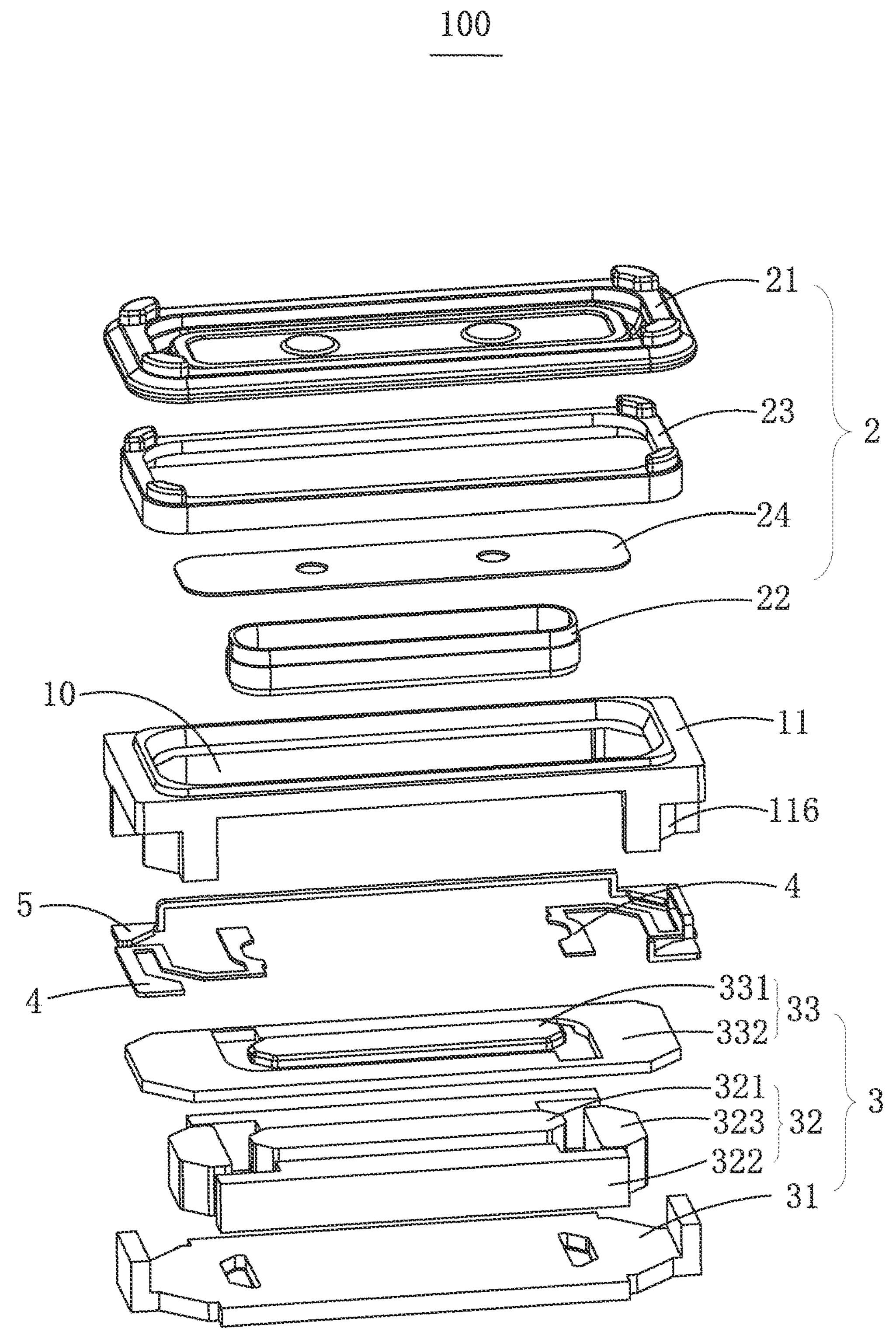
FIG. 2 is an exploded view of the sound device in FIG. 1.
Figure 3:
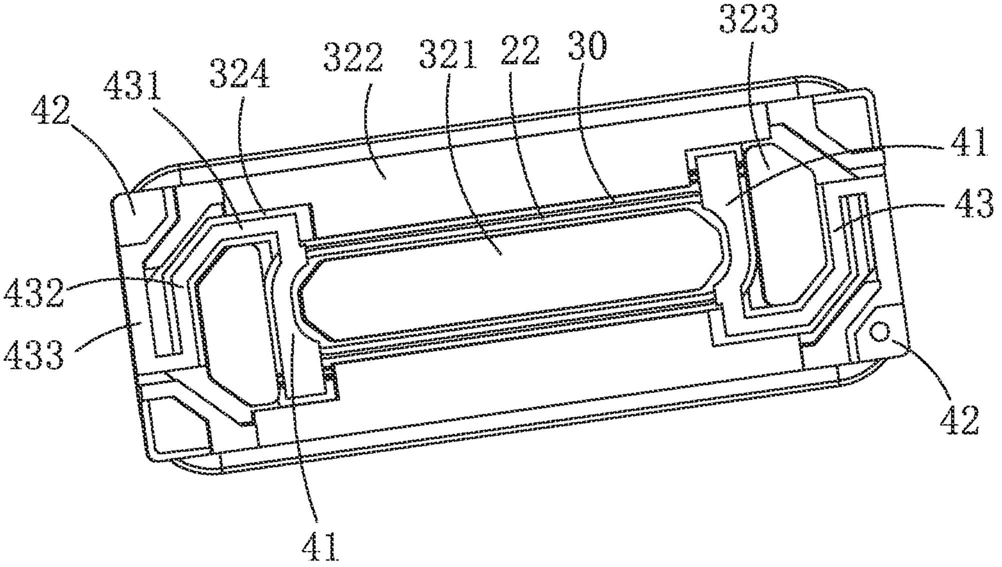
FIG. 3 is an isometric view of the sound device in FIG. 1 without a yoke.
Figure 4:
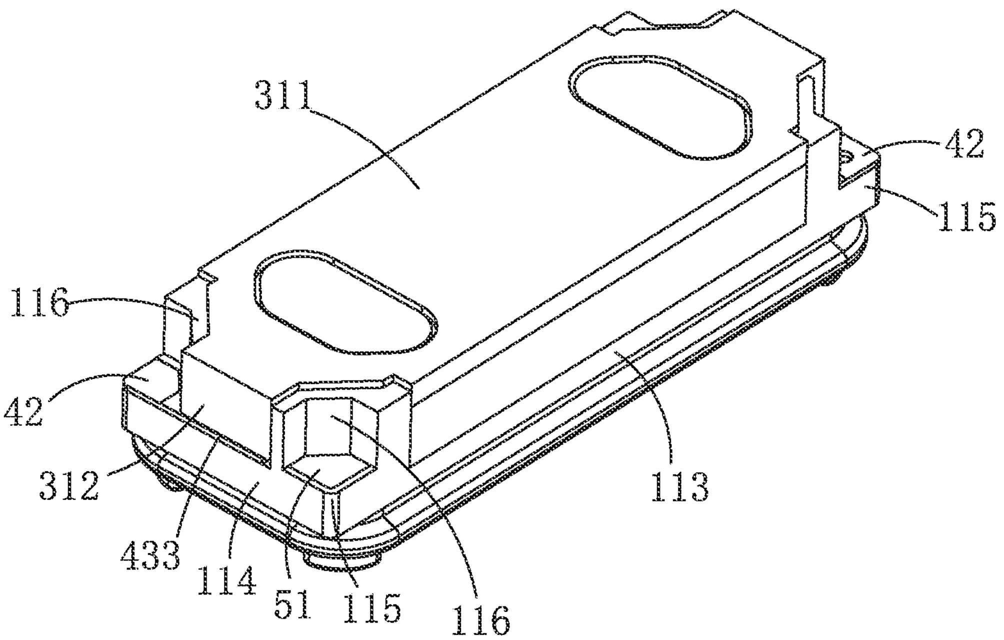
FIG. 4 is an isometric view of the sound device in FIG. 1 from another perspective.
Figure 5:
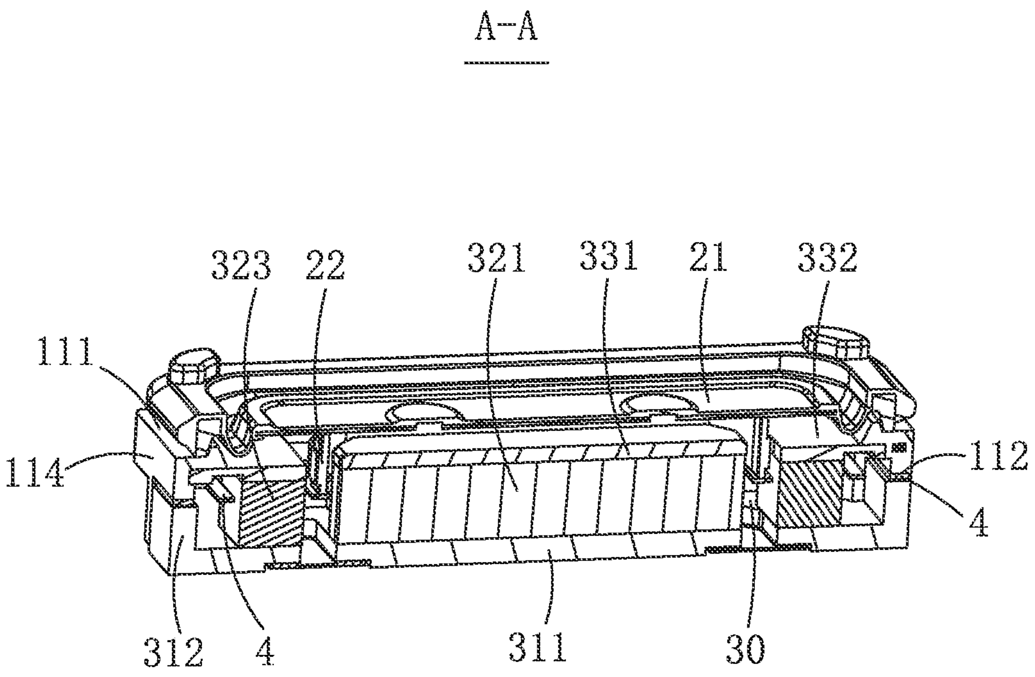
FIG. 5 is a cross-sectional view of the sound device taken along line A-A in FIG. 1.
Figure 6:
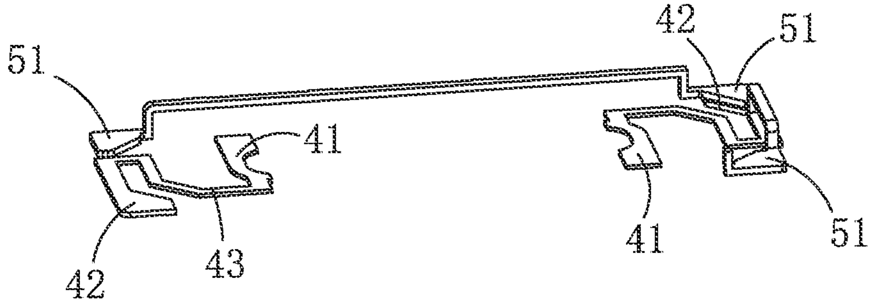
FIG. 6 is an isometric view of an assembly of a FPCB and an electrical terminal of the sound device in FIG. 1.

Please refer to FIGS. 1-6 together, a sound device 100 provided by an exemplary embodiment of the present disclosure includes a frame 1 with a receiving space 10, a vibration system 2 received in the receiving space 10, and a magnet system having a magnetic gap 30.

The vibration system 2 includes a diaphragm 21 fixed to the frame 1 and a coil 22 fixed to the diaphragm 21 and inserted into the magnetic gap 30. Specifically, the vibration system 2 further includes a fixation member 23 configured to suspend the diaphragm 21 on the frame 1 and a dome 24 fixed to the diaphragm 21. It can be seen that the diaphragm 21 is fixed to the frame 1 via the fixation member 23.

The magnet system 3 includes a yoke 31 fixed to the frame 1, a magnet 32 mounted on the yoke 31 and a magnetic plate 33 fixed on a surface of the magnet 32 away from the yoke 31.

Furthermore, the sound device 100 includes a FPCB 4 electrically connecting the coil 22 with an outer circuit. The FPCB 4 includes a first welding portion 41 connected with the coil 22, a second welding portion 42 connected with the outer circuit, and a connection portion 43 connecting the first welding portion 41 and the second welding portion 42; the second welding portion 42 is fixed to the frame 1. Additionally, the second welding portion 42 is configured to be located outside the receiving space 10 for easily connecting with the outer circuit.

Specifically, the coil 22 is in a rounded rectangle shape; in this way, the first welding portion 41 is fixed to an end of the coil 22 away from the diaphragm 21 along a short axis of the coil 22. The frame 1 includes a main body 11 fixed with the diaphragm 21, the main body 11 includes a first fixation surface 111 fixed with the diaphragm 21 and a second fixation surface 112 opposite to the first fixation surface 111 along a vibration direction of the diaphragm 21, the second welding portion 42 is fixed to the second fixation surface 112. Furthermore, the main body 11 includes a first body portion 113 extending along a long axis of the coil 22, a second body portion 114 extending along the short axis of the coil 22, and a corner portion 115 connecting the first body portion 113 and the second body portion 114, the second welding portion 42 is fixed to the corner portion 115. It can be understood that the second welding portion 42 is fixed to a side of the connection corner 115 away from the diaphragm 21 along a vibration direction.

In addition, the magnet 32 includes a main magnet 321 located in a central position of the yoke 31, a first side magnet 322 spaced apart from the main magnet 321 and extending along the long axis of the coil 22, and a second side magnet 323 spaced apart from the main magnet 321 and extending along the short axis of the coil 22; the magnetic gap 30 is formed between the main magnet 321, the first side magnet 322 and the second side magnet 323; an avoidance gap 324 is formed between the first side magnet 322 and the second side magnet 323; the first welding portion 41 is received in the magnetic gap 30, the connection portion 43 extends outside the magnetic gap 30 through the avoidance gap 324. It should be understood that the first side magnet 322 and the second side magnet 323 surrounds the main magnet 321. Correspondingly, the magnetic plate 33 includes a main plate 331 fixed to the main magnet 321 and an auxiliary plate 332 fixed to the first side magnet 322 and the second side magnet 323. It's shown that the auxiliary plate 332 is in a ring shape. An outer edge of the auxiliary plate 332 is mounted on the frame 1 to further suspend the magnet system 3 on the frame 1.

Then, the connection portion 43 includes a first connection portion 431 extending from the first welding portion 41 and passing through the avoidance gap 324, a second connection portion 432 bending and extending from the first connection portion 431, and a third connection portion 433 extending from the second connection portion 432 and fixed to the second body portion 114; the second connection portion 432 surrounds the second side magnet 323, the third connection portion 433 is fixed to the second welding portion 42.

It can be understood that the sound device 100 includes two FPCBs 4 separately arranged on the two short axis of the coil 22. Consequently, the two second welding portions 42 are diagonally fixed to the corner portion 115 of the main body 11.

The sound device 100 further includes an electrical terminal 5 fixed to the main body 11; the electrical terminal 5 includes three third welding portions 51, one of the three third welding portions 51 is electrically connected with one of the second welding portions 42, the other two of the three welding portions 51 are diagonally fixed to the corner portion 115 of the main body 11. To be clearly, the two three welding portions 51 are located on different diagonal with the second welding portions 42.

Furthermore, the yoke 31 includes a bottom plate 311 fixed with the main magnet 321 and a flange 312 bending and extending from an edge along a short axis of the bottom plate 311; the flange 312 is fixed to the second body portion 114; the third connection portion 433 is sandwiched between the flange 312 and the second body portion 114. Moreover, the frame 1 further includes a protrusion 116 extending from an inner edge of the corner portion 115 towards the yoke 31; the second welding portion 42 is located outside the protrusion 116; the protrusion 116 is fixed with the bottom plate 311.

Compared with the related art, the sound device of the present disclosure includes a frame having a receiving space, a vibration system and a magnet system having a magnetic gap; the vibration system includes a diaphragm and a coil fixed to the diaphragm; the magnet system includes a yoke fixed to the frame and a magnet mounted on the yoke; the sound device further includes a FPCB connecting the coil with an outer circuit; the FPCB includes a first welding portion connecting with the coil, a second welding portion connecting with the outer circuit, and a connection portion connecting the first welding portion and the second welding portion, the second welding portion is fixed to the frame and located outside the receiving space. By arranging the second welding portion outside the frame to serve as a pad, not only save inner space of the sound device to improve the space utilization rate, but also simplify the welding procedure of the coil and the FPCB and effectively increase the production yield and reliability of the sound device.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A sound device comprising:
a frame with a receiving space;
a magnet system having a magnetic gap, comprising:
a yoke fixed to the frame; and
a magnet mounted on the yoke;
a vibration system received in the receiving space, comprising:
a diaphragm fixed to the frame; and
a coil fixed to the diaphragm and inserted into the magnetic gap;
a FPCB electrically connecting the coil with an outer circuit, comprising:
a first welding portion connected with the coil;
a second welding portion fixed to the frame and located outside the receiving space for connecting with the outer circuit; and
a connection portion connecting the first welding portion and the second welding portion.

2. The sound device as described in claim 1, wherein the coil is in a rounded rectangle shape, the first welding portion is fixed to an end of the coil away from the diaphragm along a short axis.

3. The sound device as described in claim 2, wherein the frame comprises a main body fixed with the diaphragm, the main body comprises a first fixation surface fixed with the diaphragm and a second fixation surface opposite to the first fixation surface along a vibration direction of the diaphragm, the second welding portion is fixed to the second fixation surface.

4. The sound device as described in claim 3, wherein the main body comprises a first body portion extending along a long axis of the coil, a second body portion extending along the short axis of the coil, and a corner portion connecting the first body portion and the second body portion, the second welding portion is fixed to the corner portion.

5. The sound device as described in claim 4, wherein the magnet comprises a main magnet, a first side magnet spaced apart from the main magnet and extending along the long axis of the coil, and a second side magnet spaced apart from the main magnet and extending along the short axis of the coil; the magnetic gap is formed between the main magnet, the first side magnet and the second side magnet; an avoidance gap is formed between the first side magnet and the second side magnet; the first welding portion is received in the magnetic gap, the connection portion extends outside the magnetic gap through the avoidance gap.

6. The sound device as described in claim 5, wherein the connection portion comprises a first connection portion extending from the first welding portion and passing through the avoidance gap, a second connection portion bending and extending from the first connection portion, and a third connection portion extending from the second connection portion and fixed to the second body portion; the second connection portion surrounds the second side magnet, the third connection portion is fixed to the second welding portion.

7. The sound device as described in claim 6, wherein a number of the FPCB is two; the two FPCBs are separately arranged on the two short axis of the coil; the two second welding portions are diagonally fixed to the corner portion of the main body.

8. The sound device as described in claim 7, further comprising an electrical terminal fixed to the main body; the electrical terminal comprises three third welding portions, one of the three third welding portions is electrically connected with one of the second welding portions, the other two of the three welding portions are diagonally fixed to the corner portion of the main body.

9. The sound device as described in claim 8, wherein the yoke comprises a bottom plate fixed with the main magnet and a flange bending and extending from an edge along a short axis of the bottom plate; the flange is fixed to the second body portion; the third connection portion is sandwiched between the flange and the second body portion.

10. The sound device as described in claim 9, wherein the frame further comprises a protrusion extending from an inner edge of the corner portion towards the yoke; the second welding portion is located outside the protrusion; the protrusion is fixed to the bottom plate.

* * * * *